(12) United States Patent
Yamamoto

(10) Patent No.: US 11,385,844 B2
(45) Date of Patent: Jul. 12, 2022

(54) PRINTING SYSTEM AND PRINTING METHOD

(71) Applicant: SEIKO EPSON CORPORATION, Tokyo (JP)

(72) Inventor: Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/380,070

(22) Filed: Jul. 20, 2021

(65) Prior Publication Data

US 2022/0027101 A1 Jan. 27, 2022

(30) Foreign Application Priority Data

Jul. 22, 2020 (JP) .............................. JP2020-125013

(51) Int. Cl.
*G06F 3/12* (2006.01)
*H04N 1/60* (2006.01)

(52) U.S. Cl.
CPC .......... *G06F 3/1208* (2013.01); *G06F 3/1211* (2013.01); *G06F 3/1226* (2013.01); *G06F 3/1288* (2013.01); *H04N 1/603* (2013.01)

(58) Field of Classification Search
CPC .... G06F 3/1208; G06F 3/1211; G06F 3/1226; G06F 3/1288; G06F 3/126; G06F 3/1296; H04N 1/603; H04N 2201/3256; H04N 2201/3259; H04N 2201/326
USPC .................................................. 358/1.9, 1.15
See application file for complete search history.

(56) References Cited

U.S. PATENT DOCUMENTS

| | | | | |
|---|---|---|---|---|
| 7,355,745 | B2 * | 4/2008 | Hudson ................ | H04N 1/6058 382/163 |
| 2011/0304866 | A1 * | 12/2011 | Sawada ................. | G06F 3/1288 358/1.9 |

FOREIGN PATENT DOCUMENTS

| | | |
|---|---|---|
| JP | 2004-220164 A | 8/2004 |
| JP | 2009-178942 A | 8/2009 |

* cited by examiner

*Primary Examiner* — Kent Yip
(74) *Attorney, Agent, or Firm* — Global IP Counselors, LLP

(57) ABSTRACT

A printing system includes a terminal device, a plurality of printers, a first server, and a second server. The first server calculates a round-trip accuracy of each printer using a color conversion profile supplied from the second server with respect to target color information included in a printing command provided from the terminal device, and selects one or more printers among the plurality of printers according to the round-trip accuracy to cause the printers to execute printing.

6 Claims, 3 Drawing Sheets

PRINTING SYSTEM AND PRINTING METHOD

The present application is based on, and claims priority from JP Application Serial Number 2020-125013, filed on Jul. 22, 2020, the disclosure of which is hereby incorporated by reference herein in its entirety.

BACKGROUND

1. Technical Field

The present disclosure relates to a printing system and a printing method.

2. Related Art

JP-A-2009-178942 describes a method for efficiently operating the whole system by appropriately selecting a printer to be operated in a printing system including a plurality of printers.

However, in the related art, the color management of the printer is not mentioned, and the same color is not always output from any selected printer, and a printed matter having desired color reproduction characteristics could not be obtained in some cases.

SUMMARY

According to a first aspect of the present disclosure, a printing system constituting a network is provided. The printing system includes a terminal device, a plurality of printers, a first server that receives a printing command including image data to be used for printing and target color information indicating a target color for color reproduction from the terminal device, and selects one or more printers among the plurality of printers according to the printing command to cause the printers to execute printing, and a second server that stores a color conversion profile indicating color reproduction characteristics of the plurality of printers. The first server includes a calculation unit that calculates a round-trip accuracy with respect to each printer of the plurality of printers using the target color information and the color conversion profile supplied from the second server, and a selection unit that selects a printer to be used for printing according to the printing command depending on the round-trip accuracy. The calculation unit executes (a) processing for obtaining a first color value indicating the target color in a device-independent color system from the target color information, (b) processing for converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and (c) processing for determining a color difference between the first color value and the second color value as the round-trip accuracy.

According to a second aspect of the present disclosure, a printing method using a printing system that constitutes a network and includes a terminal device, a plurality of printers, a first server that selects one or more printers among the plurality of printers according to a printing command provided from the terminal device to cause the printers to execute printing, and a second server that stores a color conversion profile indicating color reproduction characteristics of the plurality of printers is provided. The printing method includes (i) receiving a printing command including image data to be used for printing and target color information indicating a target color to serve as a target for color reproduction from the terminal device by the first server, (ii) calculating a round-trip accuracy with respect to each printer of the plurality of printers by the first server using the target color information and the color conversion profile supplied from the second server, and (iii) selecting a printer to be used for printing according to the printing command depending on the round-trip accuracy by the first server. The step (ii) includes (a) obtaining a first color value indicating the target color in a device-independent color system from the target color information, (b) converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and (c) determining a color difference between the first color value and the second color value as the round-trip accuracy.

DESCRIPTION OF EXEMPLARY EMBODIMENTS

Figure 1:
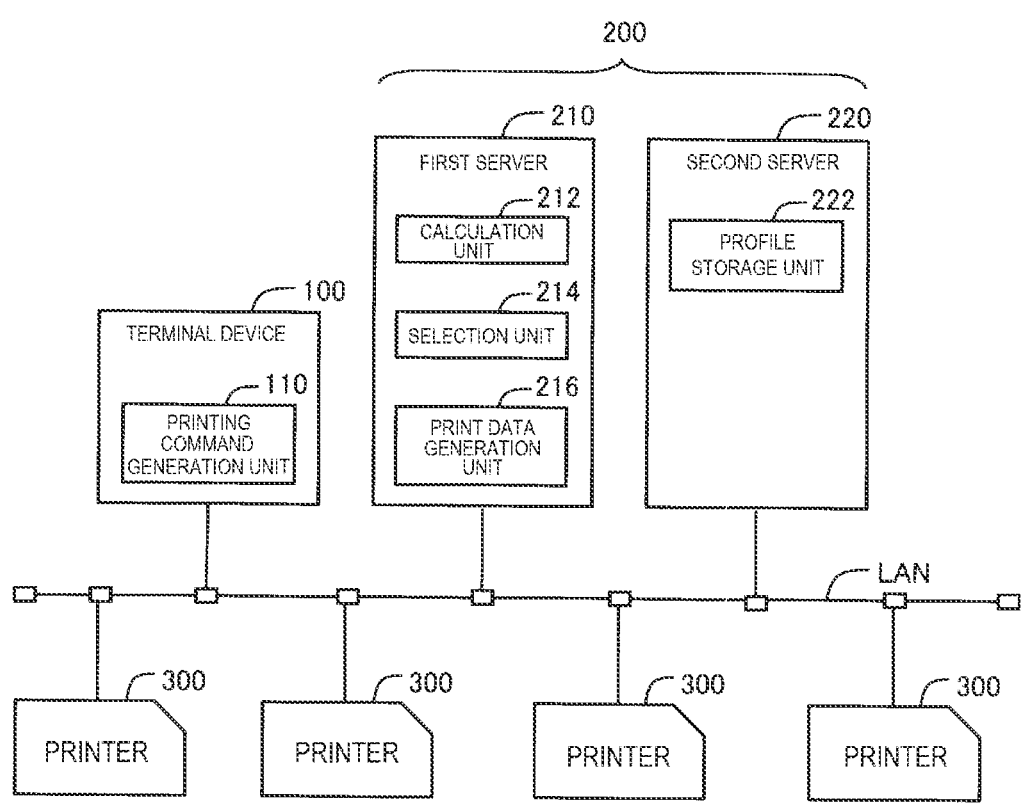
FIG. 1 is a schematic view of a printing system.

FIG. 1 is a schematic view of a printing system according to one embodiment. The printing system includes a terminal device 100, a server 200, and a plurality of printers 300, and these are coupled to one another through a LAN to constitute a network. The server 200 includes a first server 210 and a second server 220.

The first server 210 is configured as a printer server that selects one or more printers among the plurality of printers 300 according to a printing command from the terminal device 100 to cause the printers to execute printing. The first server 210 includes a calculation unit 212, a selection unit 214, and a print data generation unit 216. The calculation unit 212 has a function to calculate the below-mentioned round-trip accuracy. The selection unit 214 has a function to select one or more printers to be used for printing according to the round-trip accuracy. The print data generation unit 216 has a function to generate print data from image data and supply the print data to the printer. The functions of these respective units are realized by a processor to execute a computer program. Alternatively, some or all of the functions may be realized by a hardware circuit.

The second server 220 is configured as a database server that stores a color conversion profile indicating color reproduction characteristics of the plurality of printers. The second server 220 includes a color conversion profile storage unit 222 and supplies the color conversion profile according to a request from the first server 210. The color conversion profile storage unit 222 preferably stores the color conversion profile of each printer 300 in association with printing conditions. The printing conditions will be described later. The functions of the first server 210 and the second server 220 may also be realized by one server device or three or more server devices.

The terminal device 100 includes a printing command generation unit 110 that generates a printing command including image data and target color information indicating a target color for color reproduction according to an instruction by a user. The printing command generation unit 110 transmits the generated printing command to the first server 210. The first server 210 selects one or more printers among the plurality of printers 300 according to the printing command to cause the printers to execute printing.

In this embodiment, the plurality of printers 300 are all inkjet color printers. However, the present disclosure can also be applied to another type of color printer such as a thermal sublimation printer or a laser printer.

At least some of the plurality of printers 300 can execute printing under printing conditions different from those for the other printers. As the printing conditions, for example, at least some of the following items can be used.

Printing Conditions
(1) model of printer
(2) type of print medium
(3) print resolution
(4) ink ejection amount When a user of the terminal device 100 specifies the printing conditions, the printing command generation unit 110 generates a printing command including the printing conditions and supplies the command to the first server 210. The "ink ejection amount" specified as the printing condition means the amount of an ink to be ejected to a unit area. For example, it is specified as a coefficient indicating how many times the ink ejection amount defined in a color conversion look-up table for the printer 300 is permitted as the amount of an ink to be ejected. In the above-mentioned printing conditions, what has the largest effect on the color reproduction characteristics is the type of the print medium. Therefore, it is preferred that the printing conditions included in the printing command include at least the type of the print medium.

The color conversion profile of each printer 300 is created in advance for each combination of these printing conditions, and is stored in the color conversion profile storage unit 222 in association with the printing conditions. Other than the above-mentioned printing conditions, information necessary for reproduction of an environment where the color conversion profile is created may be used as part of the printing conditions. As the information necessary for reproduction of an environment where the color conversion profile is created, for example, there exist a drying time and a drying temperature during printing. This is because depending on the type of the printer, a printed matter is sometimes dried by heating during printing, and a drying time and a drying temperature at that time affect color reproduction.

The color conversion profile corresponding to a set of printing conditions includes the following two profiles.
(1) B2A Profile B2A profile is a profile for converting a color value in a device-independent color system into a device value in a device-dependent color system of the printer 300. For example, the color value is an L*a*b* value in the CIELAB color system, and the device value is a CMYK value or an RGB value. In the present disclosure, the device value is also referred to as "output device value". Further, the B2A profile is also referred to as "first color conversion profile".
(2) A2B Profile A2B profile is a profile for converting an output device value in the device-dependent color system of the printer 300 into a color value in the device-independent color system. In the present disclosure, the A2B profile is also referred to as "second color conversion profile".

As is well known, when color conversion is performed using a color conversion profile, a rendering intent is also utilized. The rendering intent means how to perform color conversion when the color gamut is narrowed by color conversion. In a general ICC profile, as a color conversion table for the rendering intent, three color conversion tables for perceptual, colorimetric, and saturation priority are prepared, and one of these tables is selected and used. It is preferred that an instruction as to which rendering intent is used is also included in the printing command to be transmitted to the first server 210 from the terminal device 100. When the instruction as to the rendering intent is not included in the printing command, a rendering intent set as a default is used.

Figure 2:
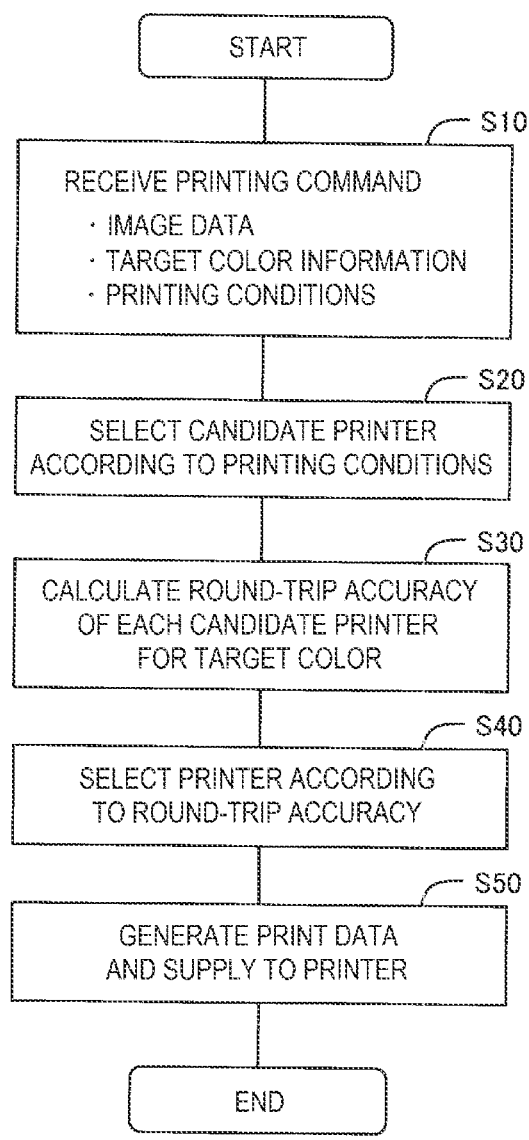
FIG. 2 is a flowchart of printing processing.

FIG. 2 is a flowchart of printing processing to be executed by the first server 210. In Step S10, a printing command is received from the terminal device 100. In this embodiment, the printing command includes image data to be used for printing, target color information indicating a target color to serve as a target for color reproduction, and printing conditions.

A pixel value of the image data is a device value of a source device, with which the image data is generated. The device value is also referred to as "source device value" in the present disclosure. The source device value is, for example, an RGB value or a CMYK value. In this embodiment, an RGB value is used as the source device value.

The target color information indicating a target color for color reproduction is information specified by a user of the terminal device 100, and is information indicating a target color for which color reproduction is desirably strictly performed when executing printing by the printer 300. As a method for specifying the target color information, for example, any of the following methods can be utilized.
(1) Method for Specifying Color Value in Device-Independent Color System This method is, for example, a method for specifying an L*a*b* value that is a color value in the CIELAB color system, and this color value becomes the target color information.
(2) Method for Specifying Color Chart Name This method is, for example, a method for specifying one color from the JIS standard color chart or the Munsell color chart. In that case, the color chart name is the target color information. The calculation unit 212 of the first server 210 determines a color value in a device-independent color system corresponding to the color chart name. Alternatively, the terminal device 100 determines a color value in a device-independent color system corresponding to the color chart name, and the color value may be used as the target color information.
(3) Method for Specifying Region on Image Data This method is a method for specifying a source device value that is a pixel value of the image data by specifying a region by a user within the image displayed on the terminal device 100. In that case, the source device value is the target color information. The calculation unit 212 of the first server 210 converts the source device value into a color value in a device-independent color system using a source profile embedded in the image data. Alternatively, the terminal device 100 converts the source device value into a color value in a device-independent color system using a source profile, and the color value may be used as the target color information.

The target color information included in the printing command may be information regarding one target color, or may be information regarding a plurality of target colors.

In Step S20, the calculation unit 212 of the first server 210 selects a printer that can execute printing according to the printing conditions as a candidate printer among the plurality of printers 300. The candidate printer is a printer for which the round-trip accuracy is calculated. It is preferred that the printing conditions to be used at that time include at least the type of the print medium. This is because the type of the print medium has the largest effect on the color reproduction characteristics among the items of the printing conditions. What has the second largest effect next to the type of the print medium is the model of the printer. Therefore, the selection of the candidate printer in Step S20 may be performed using the type of the print medium and the model of the printer.

In each printer 300, printing setting information including information corresponding to the above-mentioned printing conditions has been registered beforehand. For example, the printing setting information indicating the type of the print medium is information indicating one or more types of print media stored in a paper feed unit of the printer. Further, the printing setting information indicating a print resolution is information indicating one or more print resolutions that can be utilized in the printer. In Step S20, first, the calculation unit 212 requests the printing setting information to each printer 300, and when each printer 300 returns the printing setting information in response thereto, the calculation unit 212 compares the printing setting information with the printing conditions and selects the candidate printer. However, the calculation unit 212 may acquire and store the printing setting information of each printer 300 beforehand.

Step S20 may be omitted. In that case, all the printers 300 become candidate printers. However, if Step S20 is executed, an increase in the processing time by calculation of the round-trip accuracy with respect to a printer which is inadequate for printing can be avoided.

In Step S30, the calculation unit 212 calculates the round-trip accuracy of each candidate printer for the target color.

Figure 3:
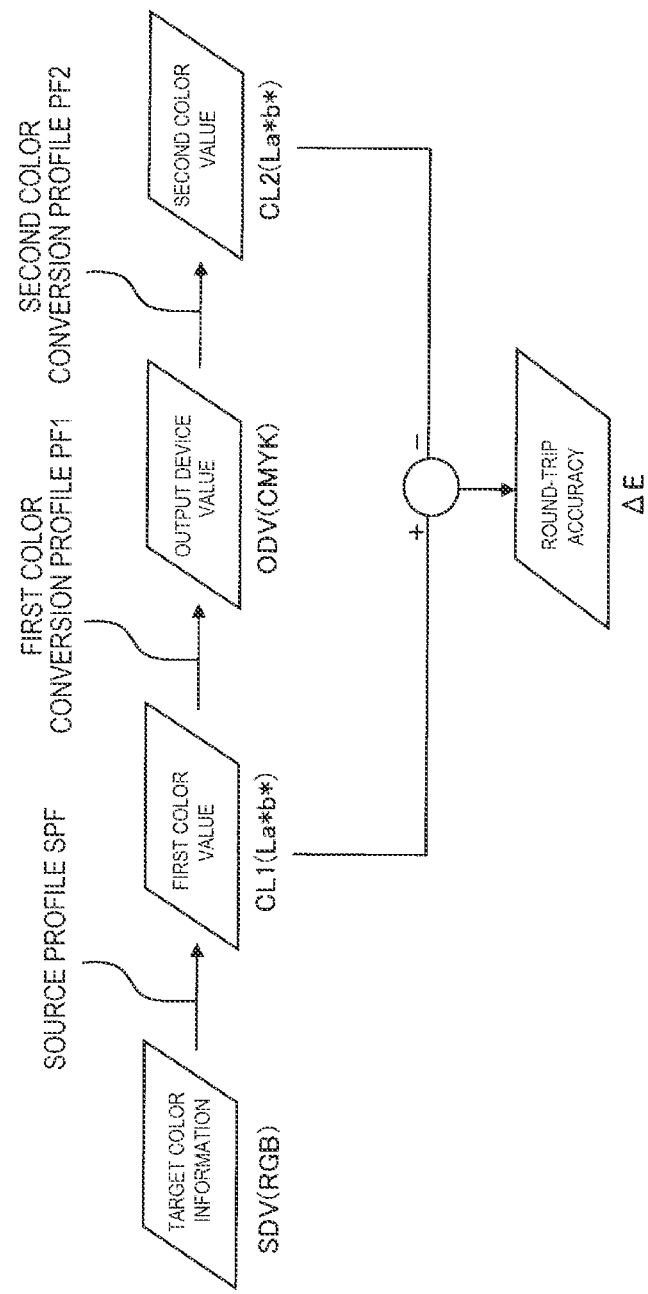
FIG. 3 is an explanatory view showing a calculation method for a round-trip accuracy.

FIG. 3 is an explanatory view showing a calculation method for the round-trip accuracy. In this example, the target color information included in the printing command is a source device value SDV expressed in RGB. The calculation unit 212 converts the source device value SDV of the target color information into a first color value CL1 in the device-independent color system using a source profile SPF included in the image data. However, when the target color information included in the printing command is expressed as a color value in the device-independent color system, this conversion processing is not needed, and the target color information itself is acquired as the first color value CL1.

Subsequently, the calculation unit 212 converts the first color value CL1 into an output device value ODV using a first color conversion profile PF1 of the candidate printer. In this example, the output device value ODV is expressed in CMYK. As described above, the first color conversion profile PF1 is the B2A profile for converting a color value in the device-independent color system into an output device value in the device-dependent color system. As the first color conversion profile PF1, one corresponding to the printing conditions included in the printing command is preferably used. However, as the first color conversion profile PF1, one corresponding to at least the type of the print medium in the printing conditions included in the printing command is preferably used, and one corresponding to at least the type of the print medium and the model of the printer is more preferably used. This is because as described above, the type of the print medium and the model of the printer have a large effect on the color reproduction characteristics among the items of the printing conditions. The other items of the printing conditions have a relatively small effect on the color reproduction characteristics, and therefore may be ignored.

Subsequently, the calculation unit 212 converts the output device value ODV into a second color value CL2 using a second color conversion profile PF2 of the candidate printer. As described above, the second color conversion profile PF2 is the A2B profile for converting the output device value in the device-dependent color system into a color value in the device-independent color system. Also as the second color conversion profile PF2, one corresponding to the printing conditions included in the printing command is preferably used in the same manner as the first color conversion profile PF1.

The color conversion profiles PF1 and PF2 used in Step S30 are acquired from the second server 220. For example, the calculation unit 212 searches for color conversion profiles stored in the color conversion profile storage unit 222 of the second server 220 using at least some items of the printing conditions as search keys, and Step S30 is executed by using the hit color conversion profiles.

The calculation unit 212 further determines a color difference $\Delta E$ between the first color value CL1 and the second color value CL2 as the round-trip accuracy of the candidate printer. When a plurality of target colors are used, it is preferred to determine the average value or the maximum value of the round-trip accuracies for the plurality of target colors as the final round-trip accuracy. As the color difference $\Delta E$, for example, a color difference $\Delta E00$ called CIEDE2000 may be used. The round-trip accuracy may also be referred to as "round-trip color difference". The round-trip accuracy can be used as an index indicating whether the color reproduction characteristics for the target color are good or bad. That is, as the value of the round-trip accuracy is smaller, the color reproduction characteristics for the target color are better. The reason why the color difference as the round-trip accuracy does not become zero is that there is a case where the color value exists outside the color gamut of the printer. When the above-mentioned color conversion is performed twice with respect to the color value that exists outside the color gamut, a color difference that is not zero occurs between the initial first color value CL1 and the second color value CL2. Therefore, it is possible to use the round-trip accuracy that is this color difference as an index indicating the favorableness of the color reproduction characteristics of the printer.

The first color value CL1 may be converted into the second color value CL2 by one-time conversion using one color conversion profile obtained by combining the first color conversion profile PF1 and the second color conversion profile PF2. Also in that case, the processing is the same as that shown in FIG. 3 in that the processing for converting the first color value CL1 into the second color value CL2 is executed using the first color conversion profile PF1 and the second color conversion profile PF2. However, when the color conversion using the first color conversion profile PF1 and the color conversion using the second color conversion profile PF2 are sequentially executed as shown in FIG. 3, there is an advantage that the round-trip accuracy can be more accurately calculated.

In Step S40, the selection unit 214 compares the round-trip accuracies for the plurality of candidate printers and selects one or more printers as printers to be used for printing. As a selection method therefor, for example, either of the following methods can be used.

(1) Selection Method 1

One printer for which the value of the round-trip accuracy is lowest is selected. In the selection method 1, a printer having most favorable color reproduction characteristics is used, and therefore, there is an advantage that a printed matter having excellent color reproduction characteristics is obtained.

(2) Selection Method 2

All the printers for which the value of the round-trip accuracy is a predetermined reference value or less are selected. The reference value is, for example, a value within a range from 1.0 to 2.0. In the selection method 2, printing can be executed using one or more printers, and therefore, there is an advantage that a time required for printing processing can be shortened.

The printing command generation unit 110 of the terminal device 100 may be configured such that a user can arbitrarily specify either of the two selection methods. In that case, the printing command including the specified selection method is transmitted to the first server 210, and the selection unit 214 selects a printer according to the specified selection method.

When a user specifies the above-mentioned selection method 2, it is preferred that the printing command generation unit 110 is configured such that the reference value for selection can be specified by the user. When the user does not specify the reference value, a preset initial setting value is used as the reference value. In general, when the target color is an achromatic color, there is a tendency that even if the color difference is small, the visually recognized difference in color is felt to be large. Therefore, when the target color is an achromatic color, it is preferred to set the reference value smaller than when the target color is a chromatic color. In the selection method 2, when a printer for which the round-trip accuracy is smaller than the reference value is not present, it is preferred that the selection unit 214 of the first server 210 notifies thereof to the user of the terminal device 100. It is preferred that in this notification, the value of the round-trip accuracy with respect to each candidate printer is included. In that case, for example, the printing command generation unit 110 is preferably configured such that a user can select a printer for which the value of the round-trip accuracy is smallest to cause the printer to execute printing.

In Step S50, the print data generation unit 216 generates the print data from the image data using the color conversion profile of the printer selected by the selection unit 219 and supplies the print data to the selected printer. As a result, printing can be executed using one or more printers having excellent color reproduction characteristics for the target color.

As described above, in the above-mentioned embodiment, one or more printers to be used for printing are selected according to the round-trip accuracy of each printer, and therefore, a printed matter having favorable color reproduction characteristics for the target color can be printed.

Other Embodiments

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a printing system constituting a network is provided. The printing system includes a terminal device, a plurality of printers, a first server that receives a printing command including image data to be used for printing and target color information indicating a target color for color reproduction from the terminal device, and selects one or more printers among the plurality of printers according to the printing command to cause the printers to execute printing, and a second server that stores a color conversion profile indicating color reproduction characteristics of the plurality of printers. The first server includes a calculation unit that calculates a round-trip accuracy with respect to each printer of the plurality of printers using the target color information and the color conversion profile supplied from the second server, and a selection unit that selects a printer to be used for printing according to the printing command depending on the round-trip accuracy. The calculation unit executes (a) processing for obtaining a first color value indicating the target color in a device-independent color system from the target color information, (b) processing for converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and (c) processing for determining a color difference between the first color value and the second color value as the round-trip accuracy.

According to this printing system, a printer to be used for printing is selected according to the round-trip accuracy of each printer, and therefore, a printed matter having favorable color reproduction characteristics for the target color can be printed.

(2) In the above-mentioned printing system, the processing (b) may include processing for converting the first color value into an output device value in the device-dependent color system using the first color conversion profile, and processing for converting the output device value into the second color value using the second color conversion profile.

According to this printing system, the round-trip accuracy can be accurately calculated by utilizing two-time color conversion using the first color conversion profile and the second color conversion profile.

(3) In the above-mentioned printing system, the target color information may be a source device value that is a pixel value of the image data, and the processing (a) may include processing for converting the source device value into the first color value using a source profile included in the image data.

According to this printing system, the source device value indicating the target color selected within the image by a user of the terminal device can be converted into the first color value in the device-independent color system.

(4) In the above-mentioned printing system, the first server may receive printing conditions including a type of a print medium from the terminal device, and the calculation unit may select a printer that can execute printing according to the printing conditions as a printer for which the round-trip accuracy is calculated from the plurality of printers.

According to this printing system, the round-trip accuracy is calculated for a printer that can execute printing according to the printing conditions, and therefore, an increase in the processing time by calculation of the round-trip accuracy with respect to a printer which is inadequate for printing can be avoided.

(5) In the above-mentioned printing system, the first server may further include a print data generation unit that generates print data from the image data using the color conversion profile of the printer selected by the selection unit and supplies the print data to the selected printer.

According to this printing system, the print data is generated from the image data using the color conversion profile of the printer selected according to the round-trip accuracy, and therefore, the print data representing the printed matter having desired color reproduction characteristics can be efficiently generated.

(6) According to a second aspect of the present disclosure, a printing method using a printing system that constitutes a network and includes a terminal device, a plurality of printers, a first server that selects one or more printers among the plurality of printers according to a printing command provided from the terminal device to cause the printers to execute printing, and a second server that stores a color conversion profile indicating color reproduction characteristics of the plurality of printers is provided. The printing method includes (i) receiving a printing command including image data to be used for printing and target color information indicating a target color to serve as a target for color reproduction from the terminal device by the first server, (ii) calculating a round-trip accuracy with respect to each printer of the plurality of printers by the first server using the target color information and the color conversion profile supplied from the second server, and (iii) selecting a printer to be used for printing according to the printing command depending on the round-trip accuracy by the first server. The step (ii) includes (a) obtaining a first color value indicating the target color in a device-independent color system from the target color information, (b) converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and (c) determining a color difference between the first color value and the second color value as the round-trip accuracy.

According to this printing method, a printer to be used for printing is selected according to the round-trip accuracy of each printer, and therefore, a printed matter having favorable color reproduction characteristics for the target color can be printed.

What is claimed is:

1. A printing system constituting a network, comprising:
a terminal device;
a plurality of printers;
a first server that receives a printing command including image data to be used for printing and target color information indicating a target color for color reproduction from the terminal device, and selects one or more printers among the plurality of printers according to the printing command to cause the printers to execute printing; and
a second server that stores a color conversion profile indicating color reproduction characteristics of the plurality of printers, wherein
the first server includes
a calculation unit that calculates a round-trip accuracy with respect to each printer of the plurality of printers using the target color information and the color conversion profile supplied from the second server, and
a selection unit that selects a printer to be used for printing according to the printing command depending on the round-trip accuracy, and
the calculation unit executes
(a) processing for obtaining a first color value indicating the target color in a device-independent color system from the target color information,
(b) processing for converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and
(c) processing for determining a color difference between the first color value and the second color value as the round-trip accuracy.

2. The printing system according to claim 1, wherein the processing (b) includes
processing for converting the first color value into an output device value in the device-dependent color system using the first color conversion profile, and
processing for converting the output device value into the second color value using the second color conversion profile.

3. The printing system according to claim 1, wherein the target color information is a source device value that is a pixel value of the image data, and
the processing (a) includes
processing for converting the source device value into the first color value using a source profile included in the image data.

4. The printing system according to claim 1, wherein the first server receives printing conditions including a type of a print medium from the terminal device, and
the calculation unit selects a printer configured to execute printing according to the printing conditions as a printer for which the round-trip accuracy is calculated from the plurality of printers.

5. The printing system according to claim 1, wherein the first server further includes
a print data generation unit that generates print data from the image data using the color conversion profile of the printer selected by the selection unit and supplies the print data to the selected printer.

6. A printing method using a printing system that constitutes a network and includes a terminal device, a plurality of printers, a first server that selects one or more printers among the plurality of printers according to a printing command provided from the terminal device to cause the printers to execute printing, and a second server that stores a color conversion profile indicating color reproduction characteristics of the plurality of printers, the method comprising:
(i) receiving a printing command including image data to be used for printing and target color information indicating a target color to serve as a target for color reproduction from the terminal device by the first server;

(ii) calculating a round-trip accuracy with respect to each printer of the plurality of printers by the first server using the target color information and the color conversion profile supplied from the second server; and (iii) selecting a printer to be used for printing according to the printing command depending on the round-trip accuracy by the first server, wherein the step (ii) includes (a) obtaining a first color value indicating the target color in a device-independent color system from the target color information, (b) converting the first color value into a second color value using a first color conversion profile for converting a color in the device-independent color system into a color in a device-dependent color system of each printer, and a second color conversion profile for converting a color in the device-dependent color system of each printer into a color in the device-independent color system, and (c) determining a color difference between the first color value and the second color value as the round-trip accuracy.

* * * * *